: US 10,216,050 B2
: Feb. 26, 2019

(12) United States Patent
Fujimoto

(54) LIQUID CRYSTAL DISPLAY DEVICE

(71) Applicant: JAPAN DISPLAY INC., Tokyo (JP)

(72) Inventor: Takamitsu Fujimoto, Ishikawa-ken (JP)

(73) Assignee: Japan Display Inc., Tokyo (JP)

( * ) Notice: Subject to any disclaimer, the term of this patent is extended or adjusted under 35 U.S.C. 154(b) by 581 days.

(21) Appl. No.: 14/993,235

(22) Filed: Jan. 12, 2016

(65) Prior Publication Data

US 2016/0124257 A1 May 5, 2016

Related U.S. Application Data

(62) Division of application No. 13/780,761, filed on Feb. 28, 2013, now Pat. No. 9,274,363.

(30) Foreign Application Priority Data

Mar. 27, 2012 (JP) .................................. 2012-072225

(51) Int. Cl.
G02F 1/1333 (2006.01)
G02F 1/1345 (2006.01)
G02F 1/1362 (2006.01)

(52) U.S. Cl.
CPC ...... *G02F 1/1345* (2013.01); *G02F 1/133345* (2013.01); *G02F 1/136204* (2013.01); *G02F 1/136286* (2013.01)

(58) Field of Classification Search
CPC ................................................ G02F 1/136204
USPC .......................................................... 349/40
See application file for complete search history.

(56) References Cited

U.S. PATENT DOCUMENTS

| 6,744,479 | B2 | 6/2004 | Hasegawa |
| 7,649,606 | B2 | 1/2010 | Matsumoto |
| 8,711,464 | B2 | 4/2014 | Ishida |
| 9,250,489 | B2 * | 2/2016 | Zhu ........................ G02F 1/1345 |
| 9,547,205 | B2 * | 1/2017 | Yokogawa .......... G02F 1/13306 |

(Continued)

FOREIGN PATENT DOCUMENTS

| JP | H11-101986 | 4/1999 |
| JP | 2002-131783 | 5/2002 |

(Continued)

OTHER PUBLICATIONS

Japanese Office Action dated Jun. 2, 2015, in Patent Application No. 2012-072225 with English translation.

*Primary Examiner* — Edward J Glick
*Assistant Examiner* — Mark D Teets
(74) *Attorney, Agent, or Firm* — Oblon, McClelland, Maier & Neustadt, L.L.P.

(57) ABSTRACT

In one embodiment, an array substrate includes an active area in the shape of a rectangle, and first, second third and fourth end portions, surrounding the active area. A source control circuit is electrically connected with one end of the source lines drawn to the third end portion from the active area. First and second common terminals of a common potential are formed in the first end portion. A power supply line is electrically connected with the first common terminal and extends along the second, third and fourth end portions in this order, and connected with the second common terminal. A branch wiring is electrically connected with an intermediate portion of the electric power supply line and the source control circuit, and extending in the first direction.

26 Claims, 5 Drawing Sheets

(56) References Cited

U.S. PATENT DOCUMENTS

| | | |
|---|---|---|
| 2008/0117558 A1 | 5/2008 | Shih et al. |
| 2009/0262094 A1 | 10/2009 | Lin |
| 2010/0118250 A1 | 5/2010 | Fujikawa |
| 2011/0242469 A1 | 10/2011 | Kawamura et al. |
| 2013/0271716 A1 | 10/2013 | Ando |

FOREIGN PATENT DOCUMENTS

| | | |
|---|---|---|
| JP | 2003-270665 | 9/2003 |
| JP | 2007-65615 | 3/2007 |
| JP | 2010-152016 | 7/2010 |
| JP | 2011-215402 | 10/2011 |

* cited by examiner

LIQUID CRYSTAL DISPLAY DEVICE

CROSS-REFERENCE TO RELATED APPLICATION

This application is a divisional of U.S. application Ser. No. 13/780,761, filed Feb. 28, 2013, and is based upon and claims the benefit of priority from prior Japanese Patent Application No. 2012-072225 filed Mar. 27, 2012, the entire contents of each of which are incorporated herein by reference.

FIELD

Embodiments described herein relate generally to a liquid crystal display device.

BACKGROUND

A liquid crystal display device is used in various fields of OA equipments such as a personal computer and a television set, taking advantage of the features such as light weight, thin shape, and low power consumption. In recent years, the liquid crystal display device is used also as displays for a portable remote terminal such as a cellular phone and PDA (personal digital assistant), a car navigation equipment, and a game machine.

In a process for manufacturing the liquid crystal display device, a measure against static electricity is indispensable. For example, there is a possibility that the static electricity generated in the manufacturing process or invaded from the outside gives damage to circuits containing various wirings and switching elements in an active area. Various techniques for improving tolerance over such static electricity are reviewed.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
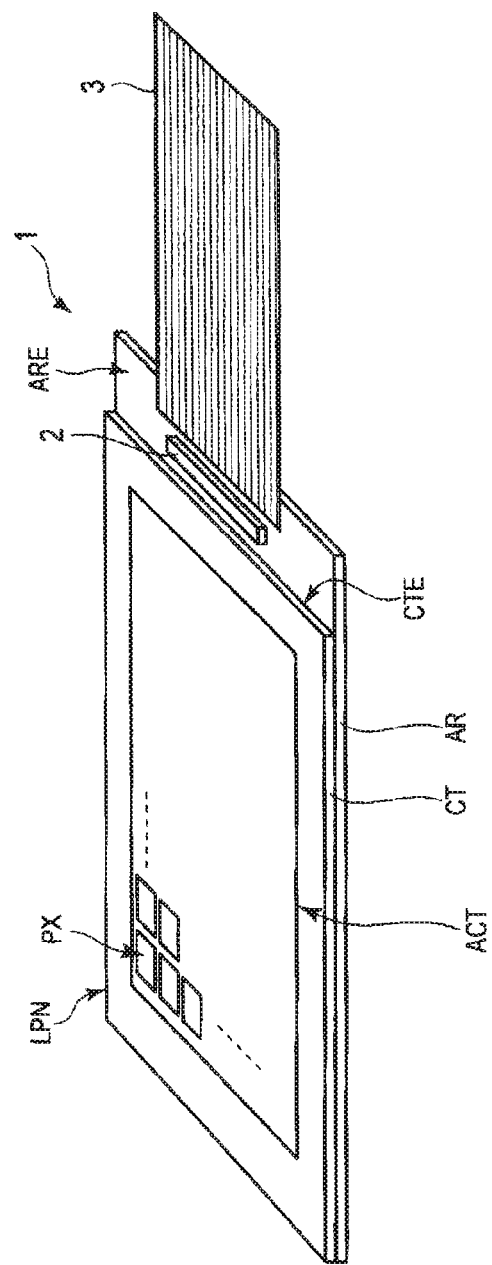
FIG. 1 is a figure schematically showing a structure of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including an active area in the shape of a rectangle having a first end portion, a second end portion, a third end portion and a fourth end portion surrounding the active area; a second substrate facing the first substrate; and a liquid crystal layer held between the first substrate and the second substrate; wherein the first substrate includes; a gate line extending in a first direction and a source line extending in a second direction orthogonally crossing the first direction in the active area, a source driver electrically connected with one end of the source lines drawn to the first end portion from the active area, a source control circuit electrically connected with the other end of the source lines drawn to the third end portion from the active area, a first common terminal and a second common terminal of a common potential formed in the first end portion, a power supply line electrically connected with the first common terminal and extending along the second, third and fourth end portions in this order, and connected with the second common terminal, and a branch wiring electrically connected with an intermediate portion of the electric power supply line along the third end portion and the source control circuit, and extending in the first direction.

FIG. 1 is a figure schematically showing a structure of a liquid crystal display device according to one embodiment.

A liquid crystal display device 1 is equipped with a liquid crystal display panel LPN of an active-matrix type, a driving IC chip 2 connected to the flexible printed circuit board 3, etc.

The liquid crystal display panel LPN is equipped with a rectangular array substrate AR (first substrate), a rectangular counter substrate CT (second substrate) facing the array substrate AR and a liquid crystal layer LQ held between the array substrate AR and the counter substrate CT. The liquid crystal display panel LPN is equipped with an active area ACT which displays images. The active area ACT is constituted by a plurality of pixels PX in a square form, for example, and arranged in the shape of a matrix of a plurality of pixels PX ("m" and "n" are positive integers).

The array substrate AR has an extending area ARE extending to outside beyond an end CTE of the counter substrate CT. The driving IC chip 2 and the flexible printed circuit board 3 function as a signal source for supplying signals required for the driving of the pixel PX and mounted in the extending area ARE of the array substrate AR.

Figure 2:
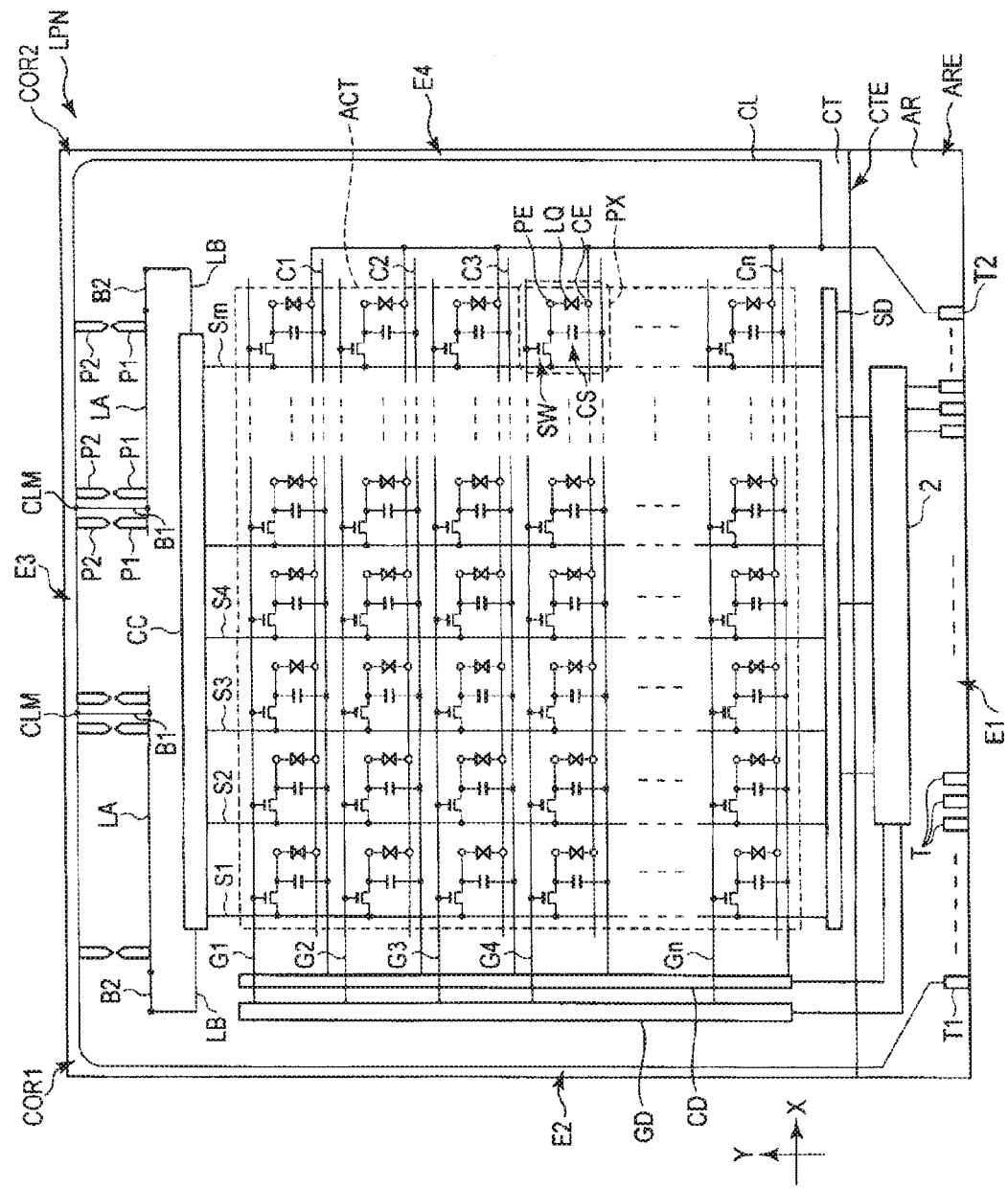
FIG. 2 is a figure schematically showing a structure and the equivalent circuit of a liquid crystal display panel shown in FIG. 1 according to the embodiment.

FIG. 2 is a figure schematically showing a structure and the equivalent circuit of a liquid crystal display panel shown in FIG. 1 according to the embodiment.

The Array substrate AR includes a first end portion E1, a second end portion E2, a third end portion E3, and a fourth end portion E4 surrounding the rectangular active area ACT. The first end portion E1 and the third end portion E3 counter mutually and extend along the first direction X, respectively. The second end portion E2 and the fourth end portion E4 counter mutually in a second direction Y that perpendicularly intersects in the first direction X. The first end portion E1 is located in the extending portion ARE. The second end portion E2, the third end portion E3, and the fourth end portion E4 counter with the counter substrate CT.

The array substrate AR is equipped with "n" gate lines G (G1-Gn), "n" auxiliary capacitance lines C (C1-Cn), "m" source lines S (S1-Sm), etc., in the active area ACT. The gate line G and the auxiliary capacitance line C linearly extend in the first direction X, respectively. The source lines S cross with the gate line G and the auxiliary capacitance line C through an insulating layer and extend linearly in the second direction Y.

Each gate line G is pulled out to the outside of the active area ACT and connected to a gate driver GD. Each auxiliary capacitance line is pulled out to the outside of the active area ACT and connected to a voltage impressing portion CD for impressing the auxiliary capacitance voltage. The respective source lines are pulled out to the outside of the active area ACT. One end of the respective source lines which are pulled out to the first end E1 portion from the active area ACT is connected to a source driver SD. Another end of the respective source lines which are pulled out to the third end portion E3 from the active area ACT is connected to a source control circuit CC. The gate driver GD, the source driver SD, and the source control circuit CC are formed in the array substrate AR.

The pixel electrode PX includes a switching element SW, a pixel electrode PE, and a common electrode CE. The switching element SW and the pixel electrode PE are formed in the array substrate AR. The common electrode CE may be arranged in the array substrate AR or the counter substrate CT. Retention capacitance Cs is formed between the pixel electrode PE and the auxiliary capacitance line C.

The switching element SW is constituted by an n channel type thin film transistor (TFT), for example. The switching element SW is electrically connected with the gate line G and the source line S. The switching element SW may be either a top-gate type or a bottom-gate type. Though the semiconductor layer is formed of poly-silicon in this embodiment, the semiconductor layer may be formed of amorphous silicon.

The pixel electrode PE is arranged in each pixel PX and electrically connected with the switching element SW. The common electrode CE is arranged in common to the plurality of pixel electrodes PE through the liquid crystal layer LQ. The pixel electrode PE and the common electrode CE are formed by light transmissive materials, such as Indium Tin Oxide (ITO), Indium Zinc Oxide (IZO), etc.

Moreover, the array substrate AR includes a plurality of terminals T, a power supply line CL, a branch wiring LA, etc., outside of the active area ACT. The plurality of terminals T is formed in the extending area ARE of the array substrate AR for connecting the flexible printed circuit board 3. Common terminals T1 and T2 of common potential are contained in the terminals T. The power supply line CL is formed along with an outermost periphery of the array substrate AR and connected with the common terminals T1 and T2, for example. The power supply line CL functions as an electric supply line which supplies common potential or a guard ring, and electrically connected with the common electrode CE, etc.

In this embodiment, one end of the power supply line CL is connected with the common terminal T1 and extending along the second end portion E2, the third end portion E3, and the fourth end portion E4 in this order, and the other end is connected to the common terminal T2. The power supply line CL located in the second end portion E2 extends along the second direction Y. The power supply line CL located in the third end portion E3 extends along the first direction X. The power supply line CL located in the fourth end portion E4 extends along the second direction Y. Moreover, the power supply line CL is formed in the shape of a curved line or circle at a corner C1 where the second end portion E2 and the third end portion E3 cross, and a corner C2 where the third end portion E3 and the fourth end portion E4 cross.

The branch wiring LA is the wiring branched from an intermediate portion CLM of the power supply line CL. The branch wiring LA extends along the first direction X between the power supply line CL located in the third end portion E3 of the array substrate AR and the source control circuit CC, and electrically connected with the intermediate portion CLM of the power supply line CL and the source control circuit CC.

In this embodiment, the intermediate portion CLM is located substantially in the center between the corner C1 and the corner C2. The branch wiring LA is formed extending from both positions close to the corner C1 and the corner C2 to the substantially center portion between the corner C1 and the corner C2, respectively. That is, the position which electrically connects the power supply line CL with the branch wiring LA is a position apart from the corner C1 and the corner C2. One end portion of the branch wiring LA and the intermediate portion CLM of the power supply line are electrically connected by a bridge B1. Moreover, the other end portion of the branch wiring LA and a drawing wiring LB pulled out from the source control circuit CC are electrically connected by a bridge B2.

Figure 3:
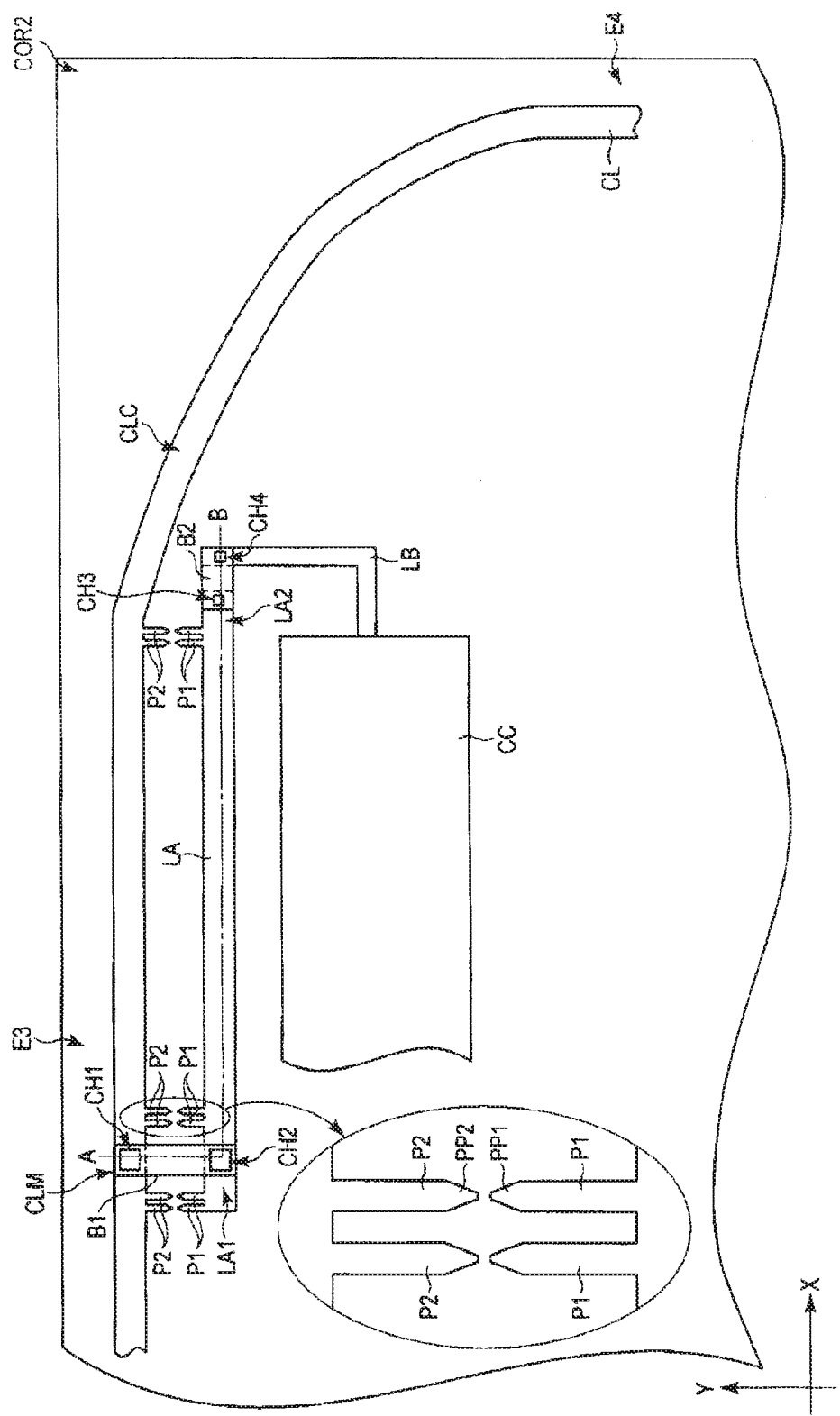
FIG. 3 is an enlarged figure showing a power supply line and a branch wiring in a circumference of a corner portion C2 in an array substrate.

The power supply line CL and the branch wiring LA are explained in detail referring to FIG. 2 and FIG. 3. FIG. 3 is an enlarged view of the branch wiring LA on a side close to the corner C2 of the array substrate AR, and only structures required for explanation are illustrated here.

The ranch wiring LA linearly extends in a straight line along the first direction X and includes one end portion LA1 and the other end portion LA2. The one end portion LA1 is located near the intermediate portion CLM of the power supply line CL. The other end portion LA2 is located near the curved portion CLC of the power supply line CL.

The branch wiring LA is equipped with a first projection P1 projecting toward the power supply line CL. The first projection P1 is integrally formed with the branch wiring LA. In this embodiment shown in the figure, the first projection P1 is formed in one end portion LA1 and the other end portion LA2 of the branch wiring LA, respectively. That is, the first projection P1 is formed in the both sides which sandwich the bridge B1 in the one end portion LA1. Moreover, in the other end portion LA2, the first projection P1 is formed near the bridge B2. The first projection P1 extends along the second direction Y toward the power supply line CL, and forms a sharp tip portion PP1. That is, as shown by enlarging in FIG. 3, the tip portion PP1 is formed approximately in the shape of a triangle.

The power supply line CL is equipped with a second projection P2 projecting toward the first projection P1. The second projection P2 is integrally formed with the power supply line CL. In this embodiment, the second projection P2 is formed near the intermediate portion CLM and the curved portion CLC, respectively. That is, in the intermediate portion CLM, the second projection P2 is formed in the both sides which sandwich the bridge B1 and faces the first projection P1, respectively. Moreover, the second projection P2 also counters with the first projection P1 near the curved portion CLC. The second projection P2 extends along the second direction Y toward the branch wiring LA and includes a sharp tip portion PP2. The tip portion PP2 is formed approximately in the shape of a triangle.

The first projection P1 and the second projection P2 are located on the same straight line in the second direction Y. Moreover, the tip portion PP1 of the first projection P1 is arranged apart from the tip portion PP2 of the second projection P2 with a gap, and apex angles thereof counter each other.

Common potential is supplied to the source control circuit CC through the power supply line CL, the bridge B1, the branch wiring LA, the bridge B2, and the drawing wiring LB. The source control circuit CC functions as an afterimage compensation circuit. When power supply is turned off, the source control circuit CC impresses common potential to all the source lines S. At the time of the power supply OFF, a control signal which changes the switching element SW into an ON state is supplied to all the gate lines G. For this reason, the common potential is written in the pixel electrode PE of each pixel PX in the active area ACT through the switching element SW. In this time, if the common potential is also impressed to the common electrode CE, since the potential difference of the pixel electrode PE and the common electrode CE becomes substantially zero, electric field currently impressed to the liquid crystal layer LQ is reset, and the afterimage can be canceled.

Figure 4:
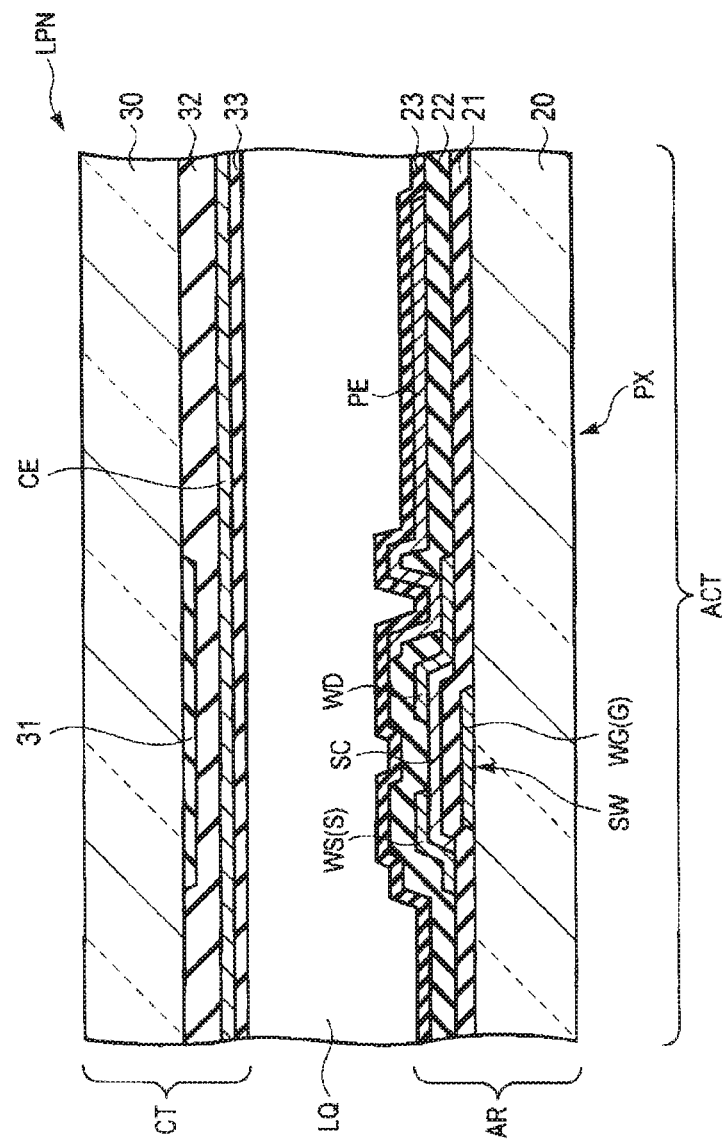
FIG. 4 is a cross-sectional view schematically showing the structure of the liquid crystal display panel shown in FIG. 2.

FIG. 4 is a cross-sectional view schematically showing the structure of the liquid crystal display panel shown in FIG. 2.

The array substrate AR is formed using a first insulating substrate 20 which has light transmissive characteristics, such as a glass substrate and a plastic substrate. The array substrate AR includes the switching element SW, the pixel electrode PE, etc. The switching element SW shown here is a thin film transistor of a bottom gated-type. The gate electrode WG of the switching element SW is formed on the first insulating substrate 20 with the gate line G. The gate electrode WG is electrically connected with the gate line G and integrally formed with the gate line G in this embodiment. The gate electrode WG is covered with a first insulating layer 21. The first insulating layer 21 is arranged also on the first insulating substrate 20.

The semiconductor layer SC of the switching element SW is formed of the amorphous silicon, for example. The semiconductor layer SC is formed on the first insulating layer 21 and located on the gate electrode WG. A source electrode WS and a drain electrode WD of the switching element SW are formed on the first insulating layer 21, and at least one portion thereof is in contact with the semiconductor layer SC, respectively. The source line S is formed on the first insulating layer 21. The source electrode WS is electrically connected with the source line S and integrally formed with the source line S in this embodiment. The source electrode WS and the drain electrode WD are covered with a second insulating layer 22 with the source line S. Moreover, the second insulating layer 22 is arranged also on the first insulating layer 21.

The pixel electrode PE is formed on the second insulating layer 22. The pixel electrode PE is in contact with the drain electrode WD through a contact hole which penetrates the second insulating layer 22. The pixel electrode PE and the second insulating layer 22 are covered with a first alignment film 23.

On the other hand, the counter substrate CT is formed using a second insulating substrate 30 which has light transmissive characteristics, such as the glass substrate and the plastic substrate. The counter substrate CT includes a black matrix 31, a color filter layer 32, etc., on the second insulating substrate 30 facing the array substrate AR. Moreover, the counter substrate CT is equipped with a common electrode CE in this embodiment.

The black matrix 31 is formed between adjoining pixels PX in the active area ACT, and counters various wiring portions such as the switching element SW, the gate line G, the source line S formed on the array substrate AR. The color filter layer 32 is arranged in each pixel PX divided by the black matrix 31 in the active area ACT. A portion of the color filter layer 32 overlaps with the black matrix 31.

In the active area ACT, the common electrode CE is formed on the color filter layer 32 facing the array substrate AR and counters the pixel electrode PE of each pixel PX through the liquid crystal layer LQ. The common electrode CE is covered with a second alignment film 33.

The array substrate AR and the counter substrate CT as mentioned above are arranged so that the first alignment film 23 faces the second alignment film 33. At this time, a spacer, for example, a pillar-shaped spacer integrally formed in one of the substrates by resin material is arranged between the array substrate AR and the counter substrate CT. Thereby, a predetermined cell gap is formed.

The liquid crystal layer LQ is enclosed in the cell gap as mentioned above. That is, the liquid crystal layer LQ is constituted by liquid crystal composite held between the pixel electrode PE of array substrate AR and the common electrode CE of the counter substrate CT.

Regarding the liquid crystal mode, there is no restriction in particular. In addition, the modes which mainly use vertical electric field or slanting electric field such as TN (Twisted Nematic) mode, OCB (Optically Compensated Bend) and VA (Vertical Aligned) mode, or the modes which mainly use lateral electric field, such as IPS (In-Plane Switching) mode and FFS (Fringe Field Switching) mode, are applicable. In the mode using the lateral electric field, the common electrode CE is formed on the array substrate AR in which the pixel electrode PE is formed.

Figure 5:
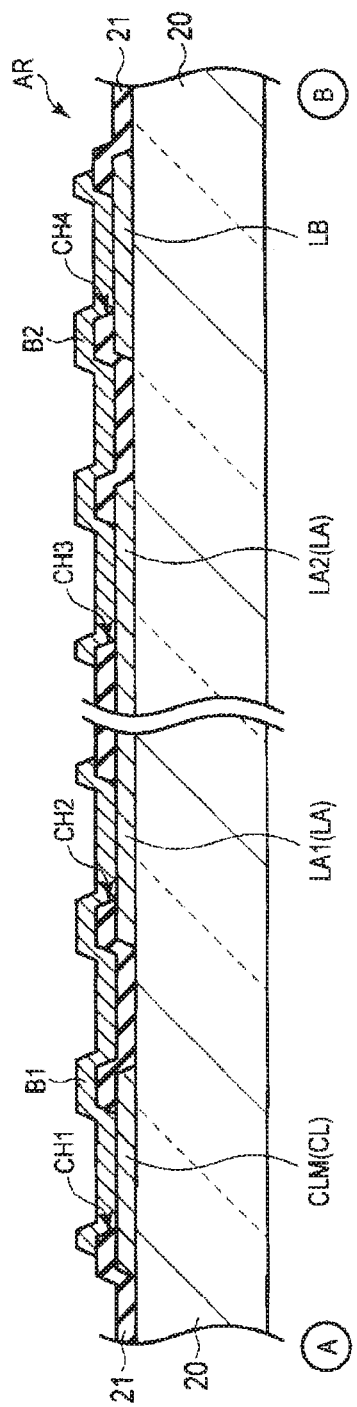
FIG. 5 is a cross-sectional view schematically showing the structure of the array substrate taken along line A-B shown in FIG. 3.

FIG. 5 is a cross-sectional view schematically showing a structure of the array substrate taken along line A-B shown in FIG. 3.

In the array substrate AR, the power supply line CL, the branch wiring LA, and the drawing wiring LB are formed on the first insulating substrate 20. That is, the power supply line CL, the branch wiring LA, and the drawing wiring LB are formed in the same layer as the gate line G, and can be formed using the same material as the gate line G. The power supply line CL, the branch wiring LA and the drawing wiring LB are covered with the first insulating layer 21.

In the first insulating layer 21, a contact hole CH1 penetrating to the intermediate portion CLM of the power supply line CL, a contact hole CH2 penetrating to the one end portion LA1 of the branch wiring LA, a contact hole CH3 penetrating the other end portion LA2 of the branch wiring LA and a contact hole CH4 penetrating to the drawing wiring LB are formed, respectively.

The bridge B1 and the bridge B2 are formed on the first insulating layer 21. That is, the bridge B1 and bridge B2 are formed in the same layer as the source line S and can be formed using the same material as the source line S.

While the bridge B1 contacts with the intermediate portion CLM through the contact hole CH1, the bridge B1 contacts with the one end portion LA1 through the contact hole CH2, and electrically connects the power supply line CL with the branch wiring LA. While the bridge B2 contacts with the other end portion LA2 through the contact hole CH3, the bridge B2 contacts with the drawing wiring LB through the contact hole CH4, and electrically connects the branch wiring LA with the drawing wiring LB.

According to this embodiment, the power supply line CL is arranged along the end of the array substrate AR. Moreover, the power supply line CL is electrically connected with the branch wiring LA arranged between the power supply line CL and a circuit, for example, the source control circuit CC located inside the power supply line CL close to the active area ACT at the intermediate portion CLM of the power supply line CL. Although the static electricity easily invades from the power supply line CL located in the circumference of the corner C1 and the corner C2, even if the static electricity invades to the power supply line CL, the static electricity is diffused in the power supply line CL, and the energy of the static electricity is consumed. Moreover, the position where the static electricity flows to inside the power supply line CL becomes the intermediate portion CLM apart from the position where the static electricity invades, i.e., in the circumference of the corner C1 and the corner C2. For this reason, during the time when the static electricity flows to the intermediate portion CLM, the energy of the static electricity is consumed. Therefore, it becomes possible to control flowing of the static electricity with high energy to the wiring or the circuit inside the power supply line CL, or destruction of the wiring and the circuit by the static electricity with high energy.

Moreover, according to this embodiment, the power supply line CL is formed in the shape of a curve at the corners C1 and C2. For this reason, as compared with a case in which a crooked form of the power supply line is applied at the corner, the static electricity becomes difficult to be collected at the curved corner portions. Therefore, it becomes possible suppress generating of the electric discharge to the inside circuit and the wiring from the power supply line CL near the corners, or destruction of the inside circuit and the wiring by the electric discharge.

Moreover, according to this embodiment, the branch wiring LA is equipped with the first projection P1 projecting toward the power supply line CL. The power supply line CL is equipped with the second projection P2 projecting toward the first projection P1. For this reason, the static electricity which flows in the power supply line CL concentrates to the second projection P2, and it becomes possible to induce the electric discharge to the first projection P1 from the second projection P2. That is, the first projection P1 and the second projection P2 function as what is called a lightning rod. By inducing the electric discharge to the first projection P1 from the second projection P2, the energy of the static electricity is consumed, and it becomes possible further to improve protective operation to the inside circuit or wiring against the static electricity.

The first projection P1 and the second projection P2 are formed near the bridge B1 which connects the intermediate portion CLM of the power supply line CL with one end portion LA1 of the branch wiring LA, and the bridge B2 which connects the other end portion LA2 of the branch wiring LA with the drawing wiring LB pulled out from the source control circuit CC, respectively. By inducing the electric discharge between the first projection P1 and the second projection P2 near the bridge B1, it becomes possible to reduce the energy of the static electricity which flows into the branch wiring LA from the power supply line CL through the bridge B1. Moreover, it becomes possible to reduce the energy of the static electricity which flows into the drawing wiring LB from the branch wiring LA through the bridge B2 by inducing the electric discharge between the first projection P1 and the second projection P2 near the bridge B2. In addition, even if the first projection P1 is shorted out with the second projection P2 by the electric discharge, since the potential of the power supply line CL and the branch wiring LA are the same, they can preserve each function.

Moreover, according to this embodiment, the bridge B1 contacts the power supply line CL and the branch wiring LA through the contact hole formed in the first insulating layer 21, and the bridge B2 contacts with the branch wiring LA and the drawing wiring LB through the contact hole formed in the first insulating layer 21. In the bridge B1 and the bridge B2, it becomes possible to consume the energy of the static electricity which flows into the contact holes by adjusting the contact resistivity of the contact hole. For example, the contact resistivity is controlled by adjusting a contact area or a diameter of the contact hole.

In the above embodiment, the source control circuit CC is connected with the branch wiring LA through the drawing wiring LB. However, other circuit device can be used in place of the source control circuit CC, and same effect can be achieved.

As explained above, according to this embodiment, it is possible to supply the liquid crystal display device which can control the static electricity defect.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the invention.

What is claimed is:

1. A display device, comprising:
    a first substrate including an active area in a shape of a rectangle having a first end portion, a second end portion, a third end portion and a fourth end portion surrounding the active area; and
    a second substrate facing the first substrate, wherein
    the first substrate includes
        a gate line extending in a first direction and a source line extending in a second direction crossing the first direction in the active area,
        a source driver electrically connected with one end of the source line drawn from the active area to the first end portion,
        a source control circuit electrically connected with the other end of the source line drawn from the active area to the third end portion,
        a first common terminal and a second common terminal of a common potential formed in the first end portion,
        a power supply line electrically connected with the first common terminal and extending along the second, third and fourth end portions in this order, and connected with the second common terminal, and
        a branch wiring electrically connected between an intermediate portion of the power supply line along the third end portion and the source control circuit through a first bridge wiring, and extending in the first direction,
    the branch wiring includes a pair of first projection portions arranged adjacently and projecting toward the power supply line,
    the power supply line includes a pair of second projection portions arranged adjacently and projecting toward the first projection portions, respectively, and
    the first bridge wiring is sandwiched between the pair of first projection portions and between the pair of second projection portions.
2. The display device according to claim 1, wherein the first substrate includes a first corner in which the second end portion and the third end portion cross, and a second corner in which the third end portion and the fourth end portion cross,
a portion of the power supply line extending along the second end portion and a portion of the power supply line extending along the third end portion form a curved shape where they meet in the first corner, and
the portion of the power supply line extending along the third end portion and a portion of the power supply line extending along the fourth end portion form a curved shape where they meet in the second corner.

3. The display device according to claim 2, wherein the intermediate portion of the power supply line is located substantially in a center portion between the first corner and the second corner.

4. The display device according to claim 1, wherein the first bridge wiring is formed in a same layer as the source line.

5. A display device, comprising:
a first substrate including an active area in a shape of a rectangle having a first end portion, a second end portion, a third end portion and a fourth end portion surrounding the active area; and
a second substrate facing the first substrate, wherein the first substrate includes
a gate line extending in a first direction and a source line extending in a second direction crossing the first direction in the active area,
a source driver electrically connected with one end of the source line drawn from the active area to the first end portion,
a source control circuit electrically connected with the other end of the source line drawn from the active area to the third end portion,
a first common terminal and a second common terminal of a common potential formed in the first end portion,
a power supply line electrically connected with the first common terminal and extending along the second, third and fourth end portions in this order, and connected with the second common terminal,
a branch wiring electrically connected with an intermediate portion of the power supply line along the third end portion and the source control circuit through a first bridge wiring, and extending in the first direction, and
an insulating layer covering the gate line, the power supply line, the branch wiring, and a drawing wiring pulled out from the source control circuit, and wherein
the branch wiring includes a pair of first projection portions arranged adjacently and projecting toward the power supply line,
the power supply line includes a pair of second projection portions arranged adjacently and projecting toward the first projection portions, respectively,
the first bridge wiring is sandwiched between the pair of first projection portions and between the pair of second projection portions,
the first substrate includes a first corner in which the second end portion and the third end portion cross, and a second corner in which the third end portion and the fourth end portion cross,
the intermediate portion of the power supply line is located substantially in a center portion between the first corner and the second corner, the first substrate includes a second bridge wiring to connect one end portion of the branch wiring and the drawing wiring,
the first and second bridge wirings are formed on the insulating layer,
the first bridge wiring is electrically connected with the other end portion of the branch wiring and the intermediate portion of the power supply line through a first contact hole, and
the second bridge wiring is electrically connected with the one end portion of the branch wiring and the drawing wiring through a second contact hole.

6. The display device according to claim 5, wherein the first bridge wiring and the second bridge wiring are formed in a same layer as the source line.

7. A display device, comprising:
a substrate including an active area in a shape of a square having a first end portion, a second end portion, a third end portion and a fourth end portion surrounding the active area, wherein
the substrate includes
a gate line extending in a first direction and a source line extending a second direction crossing the first direction in the active area,
a source driver electrically connected with one end of the source line drawn from the active area to the first end portion,
a first common terminal and a second common terminal of a common potential formed in the first end portion,
a power supply line electrically connected with the first common terminal and extending along the second, third and fourth end portions in this order, and electrically connected with the second common terminal,
a circuit device arranged between the third end portion of the power supply line and the active area, and
a branch wiring electrically connected with an intermediate portion of the power supply line along the third end portion and the circuit device through a first bridge wiring, and extending in the first direction,
the branch wiring includes a pair of first projection portions arranged adjacently and projecting toward the power supply line,
the power supply line includes a pair of second projection portions arranged adjacently and projecting toward the first projection portions, respectively, and
the first bridge wiring is sandwiched between the pair of first projection portions and between the pair of second projection portions.

8. The display device according to claim 7, wherein the substrate includes a first corner in which the second end portion and the third end portion cross, and a second corner in which the third end portion and the fourth end portion cross,
a portion of the power supply line extending along the second end portion and a portion of the power supply line extending along the third end portion form a curved shape where they meet in the first corner, and
the portion of the power supply line extending along the third end portion and a portion of the power supply line extending along the fourth end portion form a curved shape where they meet in the second corner.

9. The display device according to claim 8, wherein the intermediate portion of the power supply line is located substantially in a center portion between the first corner and the second corner.

10. The display device according to claim 1, wherein
the substrate includes a second bridge wiring to electrically connect one end portion of the branch wiring and a drawing wiring,
an insulating layer covers the gate line, the power supply line, the branch wiring, and the drawing wiring pulled out from the source control circuit,
the first and second bridge wirings are formed on the insulating layer,
the first bridge wiring is electrically connected with the other portion of the branch wiring and the intermediate portion of the power supply line through a first contact hole, and
the second bridge wiring is electrically connected with the one end portion of the branch wiring and the drawing wiring through a second contact hole.

11. The display device according to claim 7, wherein
the substrate includes a second bridge wiring to connect one end portion of the branch wiring and a drawing wiring,
an insulating layer covers the gate line, the power supply line, the branch wiring, and the drawing wiring pulled out from the circuit device,
the first and second bridge wirings are formed on the insulating layer,
the first bridge wiring is electrically connected with the other end portion of the branch wiring and the intermediate portion of the power supply line through a first contact hole, and
the second bridge wiring is electrically connected with the one end portion of the branch wiring and the drawing wiring through a second contact hole.

12. The display device according to claim 10, wherein the first bridge wiring and the second bridge wiring are formed in a same layer as the source line.

13. The display device according to claim 11, wherein the first bridge wiring and the second bridge wiring are formed in a same layer as the source line.

14. A display device, comprising:
a substrate including an active area in a shape of a rectangle having a first end portion, a second end portion, a third end portion and a fourth end portion surrounding the active area, wherein
the substrate includes
a gate line and a source line in the active area,
a circuit device formed in the third end portion,
a first terminal and a second terminal formed in the first end portion,
a power supply line electrically connected with the first terminal and extending along the second, third and fourth end portions in this order, and connected with the second terminal, and
a branch wiring electrically connected between an intermediate portion of the power supply line along the third end portion and the circuit device through a first bridge wiring, and extending in a first direction,
the branch wiring includes a pair of first projection portions arranged adjacently and projecting toward the power supply line,
the power supply line includes a pair of second projection portions arranged adjacently and projecting toward the first projection portions, respectively, and
the first bridge wiring is sandwiched between the pair of first projection portions and between the pair of second projection portions.

15. The display device according to claim 14, wherein the substrate includes a first corner in which the second end portion and the third end portion cross, and a second corner in which the third end portion and the fourth end portion cross,
the portion of the power supply line extending along the second end portion and the portion of the power supply line extending along the third end portion form a curved shape where they meet in the first corner, and
the portion of the power supply line extending along the third end portion and the portion of the power supply line extending along the fourth end portion form a curved shape where they meet in the second corner.

16. The display device according to claim 15, wherein the intermediate portion of the power supply line is located substantially in a center portion between the first corner and the second corner.

17. The display device according to claim 14, wherein the first bridge wiring is formed in a same layer as the source line.

18. A display device, comprising:
a substrate including an active area in a shape of a rectangle having a first end portion, a second end portion, a third end portion and a fourth end portion surrounding the active area, wherein
the substrate includes
a gate line and a source line in the active area,
a circuit device formed in the third end portion,
a first terminal and a second terminal formed in the first end portion,
a power supply line electrically connected with the first terminal and extending along the second, third and fourth end portions in this order, and connected with the second terminal,
a branch wiring electrically connected with an intermediate portion of the power supply line along the third end portion and the circuit through a first bridge wiring, and extending in a first direction, and
an insulating layer covering the gate line, the power supply line, the branch wiring, and a drawing wiring pulled out from the circuit device, and wherein
the branch wiring includes a pair of first projection portions arranged adjacently and projecting toward the power supply line,
the power supply ne includes a pair of second projection portions arranged adjacently and projecting toward the first projection portions, respectively, and
the first bridge wiring is sandwiched between the pair of first projection portions and between the pair of second projection portions,
the substrate includes a first corner in which the second end portion and the third end portion cross, and a second corner in which the third end portion and the fourth end portion cross,
the intermediate portion of the power supply line is located substantially in a center portion between the first corner and the second corner,
the substrate includes a second bridge wiring to connect one end portion of the branch wiring and the drawing wiring,
the first and second bridge wirings are formed on the insulating layer,
the first bridge wiring is electrically connected with the other end portion of the branch wiring and the intermediate portion of the power supply line through a first contact hole, and the second bridge wiring is electrically connected with the one end portion of the branch wiring and the drawing wiring through a second contact hole.

19. The display device according to claim 18, wherein the first bridge wiring and the second bridge wiring are formed in a same layer as the source line.

20. A display device, comprising:
a substrate including an active area in a shape of a square having a first end portion, a second end portion, a third end portion and a fourth end portion surrounding the active area, wherein
the substrate includes
a gate line and a source line in the active area,
a first terminal and a second terminal formed in the first end portion,
a power supply line electrically connected with the first terminal and extending along the second, third and fourth end portions in this order, and electrically connected with the second terminal,
a circuit device arranged between the third end portion of the power supply line and the active area, and
a branch wiring electrically connected with an intermediate portion of the power supply line along the third end portion and the circuit device through a first bridge wiring, and extending in a first direction,
the branch wiring includes a pair of first projection portions arranged adjacently and projecting toward the power supply line,
the power supply line includes a pair of second projection portions arranged adjacently and projecting toward the first projection portions, respectively, and
the first bridge wiring is sandwiched between the pair of first projection portions and between the pair of second projection portions.

21. The display device according to claim 7, wherein the substrate includes a first corner in which the second end portion and the third end portion cross, and a second corner in which the third end portion and the fourth end portion cross,
the portion of the power supply line extending along the second end portion and the portion of the power supply line extending along the third end portion form a curved shape where they meet in the first corner, and
the portion of the power supply line extending along the third end portion and the portion of the power supply line extending along the fourth end portion form a curved shape where they meet in the second corner.

22. The display device according to claim 21, wherein the intermediate portion of the power supply line is located substantially in a center portion between the first corner and the second corner.

23. The display device according to claim 14, wherein
the substrate includes a second bridge wiring to electrically connect one end portion of the branch wiring and a drawing wiring,
an insulating layer covers the gate line, the power supply line, the branch wiring, and the drawing wiring pulled out from the circuit device,
the first and second bridge wirings are formed on the insulating layer,
the first bridge wiring is electrically connected with the other portion of the branch wiring and the intermediate portion of the power supply line through a first contact hole, and
the second bridge wiring is electrically connected with the one end portion of the branch wiring and the drawing wiring through a second contact hole.

24. The display device according to claim 20, wherein
the substrate includes a second bridge wiring to connect one end portion of the branch wiring and a drawing wiring,
an insulating layer covers the gate line, the power supply line, the branch wiring, and the drawing wiring pulled out from the circuit device,
the first and second bridge wirings are formed on the insulating layer,
the first bridge wiring is electrically connected with the other end portion of the branch wiring and the intermediate portion of the power supply line through a first contact hole, and
the second bridge wiring is electrically connected with the one end portion of the branch wiring and the drawing wiring through a second contact hole.

25. The display device according to claim 23, wherein the first bridge wiring and the second bridge wiring are formed in a same layer as the source line.

26. The display device according to claim 24, wherein the first bridge wiring and the second bridge wiring are formed in a same layer as the source line.

* * * * *